(12) United States Patent
Zhong et al.

(10) Patent No.: US 11,108,783 B2
(45) Date of Patent: Aug. 31, 2021

(54) MULTI-FACTOR AUTHENTICATION WITH GEOLOCATION AND SHORT-RANGE COMMUNICATION

(71) Applicant: T-Mobile USA, Inc., Bellevue, WA (US)

(72) Inventors: Michael Zhong, Newcastle, WA (US); Dragos Lazar, Issaquah, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 301 days.

(21) Appl. No.: 16/226,101

(22) Filed: Dec. 19, 2018

(65) Prior Publication Data

US 2020/0204566 A1 Jun. 25, 2020

(51) Int. Cl.
*H04L 29/06* (2006.01)
*H04W 4/80* (2018.01)
(Continued)

(52) U.S. Cl.
CPC ........ *H04L 63/107* (2013.01); *G07C 9/00309* (2013.01); *G10L 15/22* (2013.01); *H04L 63/0853* (2013.01); *H04L 63/101* (2013.01); *H04W 4/023* (2013.01); *H04W 4/80* (2018.02); *H04W 12/06* (2013.01); *G10L 2015/223* (2013.01); *H04L 2463/082* (2013.01); *H04W 88/02* (2013.01)

(58) Field of Classification Search
CPC . H04L 63/107; H04L 63/101; H04L 63/0853; H04L 63/0876; H04L 2463/082; H04W 4/80; H04W 4/023; H04W 12/06; H04W 12/08; H04W 12/69; H04W 88/02; G10L 15/22; G10L 2015/223; G07C 9/00309; G07C 9/29; G07C 9/27; G07C 9/28; G07C 9/25; G07C 9/00563; G07C 9/00571; G07C 2209/14; G07C 2209/63
See application file for complete search history.

(56) References Cited

U.S. PATENT DOCUMENTS 6,298,261 B1 10/2001 Rex
6,522,027 B1 2/2003 Morillon et al.
(Continued)

OTHER PUBLICATIONS

U.S. Appl. No. 16/226,089, Final Office Action dated Mar. 3, 2020, 30 pages.
(Continued)

*Primary Examiner* — Khoi V Le
(74) *Attorney, Agent, or Firm* — Han Santos, PLLC

(57) ABSTRACT

A method of multi-factor authentication is performed by an access control device. In response to detecting a beacon signal transmitted by a user equipment (UE) via a short-range radio access technology (RAT) the access control device sends a query to a location server for a current location of the UE. The access control device then determines whether the UE is within a threshold distance of the access control device and, if so, begins monitoring a signal strength of one or more beacon signals transmitted by the UE. If the signal strength of the one or more beacon signals exceeds a signal strength threshold, then the access control device may generate an access signal to indicate that a user associated with the UE is authorized to access a protected resource.

20 Claims, 10 Drawing Sheets

(51) Int. Cl.
*H04W 4/02* (2018.01)
*G10L 15/22* (2006.01)
*H04W 12/06* (2021.01)
*G07C 9/00* (2020.01)
*H04W 88/02* (2009.01)

(56) References Cited

U.S. PATENT DOCUMENTS

| | | | |
|---|---|---|---|
| 8,625,796 B1 * | 1/2014 | Ben Ayed | H04L 63/0853 380/258 |
| 9,075,979 B1 * | 7/2015 | Queru | G06F 21/34 |
| 9,355,231 B2 | 5/2016 | Disraeli | |
| 9,584,965 B2 | 2/2017 | Good et al. | |
| 9,734,643 B2 | 8/2017 | Hanson et al. | |
| 9,843,591 B2 | 12/2017 | Bliss | |
| 9,867,009 B2 | 1/2018 | Mycek et al. | |
| 9,961,543 B2 | 5/2018 | Zhang | |
| 9,972,146 B1 | 5/2018 | Beard et al. | |
| 10,339,737 B1 | 7/2019 | Santhosh et al. | |
| 10,410,449 B2 | 9/2019 | Jones et al. | |
| 10,453,281 B1 | 10/2019 | Lopez et al. | |
| 10,735,411 B1 * | 8/2020 | Hardt | G06N 20/00 |
| 2005/0287963 A1 | 12/2005 | Ikeda | |
| 2006/0290519 A1 | 12/2006 | Boate et al. | |
| 2009/0002981 A1 | 1/2009 | Knibbe | |
| 2012/0068822 A1 | 3/2012 | Sheikman et al. | |
| 2012/0135683 A1 | 5/2012 | Lee et al. | |
| 2012/0280789 A1 | 11/2012 | Gerhardt et al. | |
| 2012/0284517 A1 | 11/2012 | Lambert | |
| 2013/0237193 A1 * | 9/2013 | Dumas | G07C 9/00571 455/414.1 |
| 2014/0065997 A1 | 3/2014 | Walker et al. | |
| 2014/0109633 A1 | 4/2014 | Romero | |
| 2014/0118107 A1 | 5/2014 | Almomani | |
| 2014/0265359 A1 | 9/2014 | Cheng et al. | |
| 2014/0267740 A1 | 9/2014 | Almomani et al. | |
| 2015/0067792 A1 | 3/2015 | Benoit et al. | |
| 2015/0102609 A1 | 4/2015 | Johnson et al. | |
| 2015/0256973 A1 * | 9/2015 | Raounak | H04W 12/0609 726/7 |
| 2016/0012655 A1 | 1/2016 | Hanson et al. | |
| 2016/0017640 A1 | 1/2016 | Soloway et al. | |
| 2016/0055689 A1 | 2/2016 | Raina et al. | |
| 2016/0055697 A1 | 2/2016 | Raina et al. | |
| 2017/0230378 A1 | 8/2017 | Bliss | |
| 2018/0005469 A1 | 1/2018 | Campbell et al. | |
| 2018/0014193 A1 | 1/2018 | Dennis et al. | |
| 2018/0038937 A1 | 2/2018 | Afzal | |
| 2018/0135337 A1 | 5/2018 | Johnson et al. | |
| 2018/0139569 A1 | 5/2018 | Padgett et al. | |
| 2018/0162321 A1 | 6/2018 | Spiess | |
| 2018/0240292 A1 | 8/2018 | Chen | |
| 2019/0085614 A1 | 3/2019 | Chia et al. | |
| 2019/0102730 A1 | 4/2019 | Giorgi et al. | |
| 2019/0172286 A1 | 6/2019 | Martin et al. | |
| 2019/0311562 A1 | 10/2019 | Campbell et al. | |
| 2020/0027295 A1 | 1/2020 | Bigert et al. | |

OTHER PUBLICATIONS

U.S. Appl. No. 16/226,089, Non Final Office Action dated Nov. 26, 2019, 29 pages.

Cim. 'Guide: How do I set up Auto-Unlock and how does it work?'. In Sesame community, CandyHouse.co [online]. Nov. 3, 2016 at 03:48AM [retrieved on Dec. 18, 2018]. Retrieved from the Internet: URL: <https://community.candyhouse.co/t/guide-how-do-i-set-up-auto-unlock-and-how-does-it-work/257>. pp. 1-4.

How it works. Product Description [online]. August.com., 2018 [retrieved on Dec. 18, 2018]. Retrieved from the Internet: URL: <https://august.com/pages/how-it-works>.

Smart Lock Pro + Connect. Product Listing [online]. August.com, 2018 [retrieved on Dec. 18, 2018]. Retrieved from the Internet: URL: <https://august.com/products/august-smart-lock-pro-connect>.

Touch-to-Open Smart lock. Product Listing [online]. Kwikset.com Kevo Smart Locks, 2018 [retrieved on Dec. 18, 2018]. Retrieved from the Internet: URL: <https://www.kwikset.com/kevo/default>.

Yale Real Living Key Free Deadbolt. Product Listing [online]. YaleHome.com, 2018 [retrieved on Dec. 18, 2018]. Retrieved from the Internet: URL: <https://www.yalehome.com/en/yale/yalehome/residential/yale-real-living-key-free-deadbolt>.

U.S. Appl. No. 16/226,089, Notice of Allowance dated May 20, 2020, 34 pages.

U.S. Appl. No. 16/226,071, Office Action dated Jan. 7, 2021, 31 pages.

* cited by examiner

MULTI-FACTOR AUTHENTICATION WITH GEOLOCATION AND SHORT-RANGE COMMUNICATION

BACKGROUND

A technological revolution in the home is driving development for new "smart" services, including consolidation by service providers in the fields of data, voice, video, security, energy management, etc., as well as with expanding home networks. Buildings are getting smarter and more convenient as a means to reduce operational costs for enterprise facilities.

In the area of home and building automation, smart homes and buildings may provide control over virtually any device or system in the home or office, from appliances to plug-in electric vehicle (PEV) security systems. As such, in the near future, increasing development will lead to numerous 'smart' devices surrounding a user at home, in vehicles, at work, and in many other locations. These smart devices are increasingly popular for sensing environmental conditions, controlling equipment, and securely providing information, control, and alerts to users via applications of the network-connected devices that are connected to the cloud-based services. Various approaches are used in these systems to authenticate the identity of users of the network-connected devices and systems, to provide privacy and security for the users and user-related information. However, conventional authentication methods for identifying a user by a smart device typically require significant user participation. For example, a smart lock may be deployed in a building or other structure to provide controlled access to a protected resource, such as a room, office, storage, area, etc. Conventional smart locks typically provide the user with the ability to unlock/lock the smart lock by way of their network-connected devices. Often, however, these conventional smart locks require that a dedicated application be installed on their network-connected device, where the application requires the user to provide some input for authentication (e.g., password). Furthermore, these conventional applications often communicate directly with the smart lock in order to activate the lock, which may present a security vulnerability should an un-authorized user attempt to spoof the user's device or otherwise hack into the smart lock itself.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Aspects of the present disclosure are directed to computing platforms (i.e., user equipment, server, etc.), computer-readable media, and processes for use with an access control device (ACD).

A user device, or user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Figure 1:
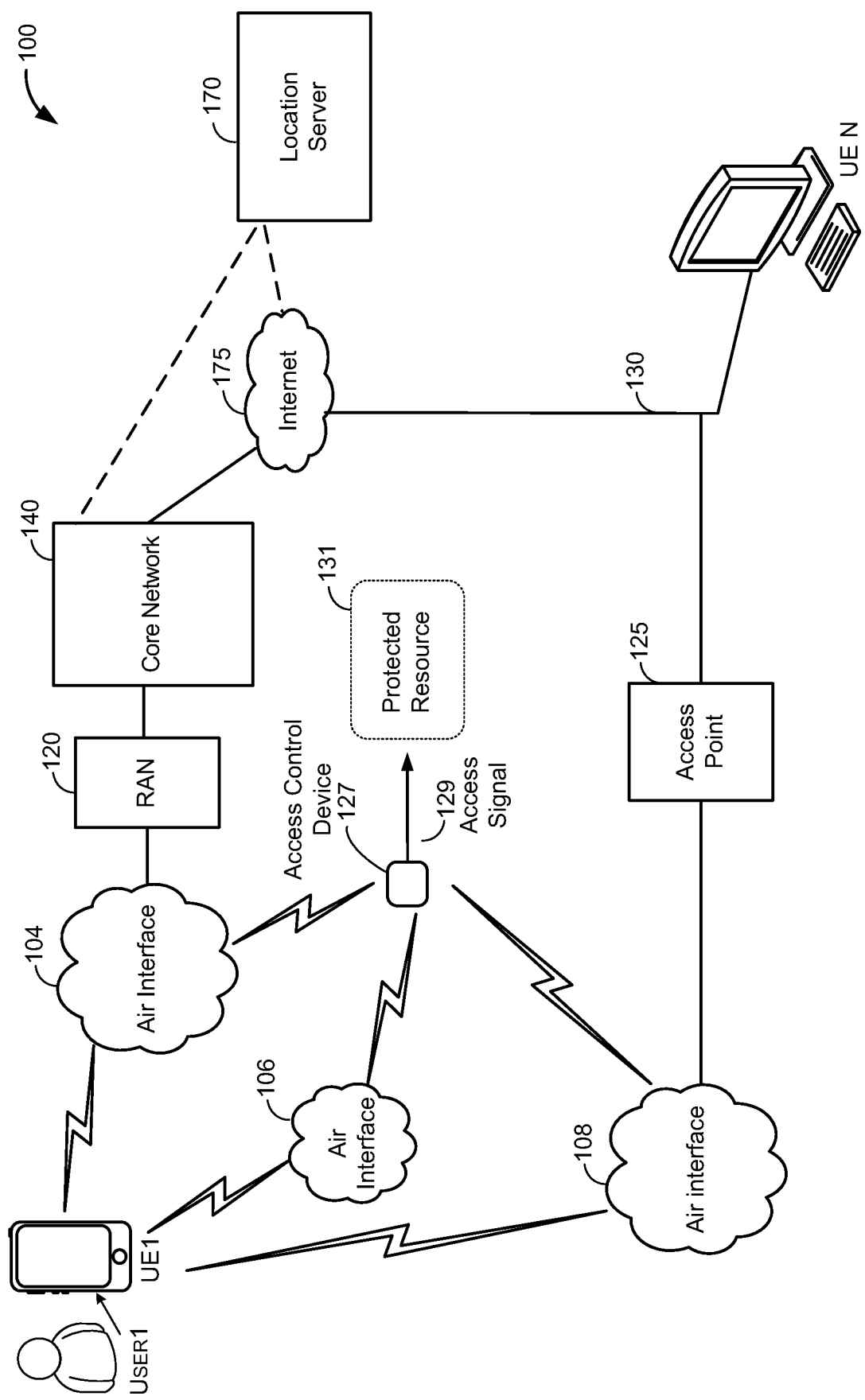
FIG. 1 illustrates an example architecture of a wireless communication network.

FIG. 1 illustrates a high-level system architecture of a wireless communication network 100 in accordance with various aspects. The wireless communication network 100 contains UE1. UE1 may include a mobile phone, a personal computer (e.g., a laptop computer, desktop computer, etc.), and so on. For example, in FIG. 1, UE1 is illustrated as a cellular touchscreen mobile phone or smart phone.

Referring to FIG. 1, UE1 is configured to communicate with an access network (e.g., the RAN 120, an access point 125, etc.) over a physical communications interface or layer, shown in FIG. 1 as air interfaces 104 and 108 and/or a direct wired connection 130. The air interface 104 can comply with a given cellular communications protocol (e.g., CDMA, EVDO, eHRPD, GSM, EDGE, W-CDMA, LTE, etc.), while the air interface 108 can comply with a wireless IP protocol (e.g., wi-fi, IEEE 802.11). The RAN 120 includes a plurality of access points that serve UEs over air interfaces, such as the air interface 104. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UE N and UE 1 via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE1 over a local wireless connection, such as IEEE 802.11 in an example. UE N is shown as a desktop computer with a direct wired connection 130 to the Internet 175, such as a direct connection to a modem or router, which can correspond to the access point 125 itself in an example (e.g., for a Wi-Fi router with both wired and wireless connectivity).

The core network 140 is configured to support one or more communication services (e.g., Voice-over-Internet Protocol (VoIP) sessions, Push-to-Talk (PTT) sessions, group communication sessions, social networking services, etc.) for UEs that can connect to the core network 140 via the RAN 120 and/or via the Internet 175, and/or to provide content (e.g., web page downloads) to the UEs.

Further illustrated in FIG. 1 is an access control device (ACD) 127. In some aspects, the ACD 127 is deployed to provide authentication (and authorization) for User1 to access a protected resource 131. For example, protected resource 131 may be a building, room, storage, etc., where ACD 127 authenticates the User1 and then generates an access signal 129 to trigger access to the protected resource 131 (e.g., by unlocking and/or automatically opening a door). In other examples, the protected resource 131 may be a software application of a computing device (e.g., laptop, computer, terminal, etc.) where, after authentication, the ACD 127 may generate the access signal 129 to unlock and/or grant User1 access to the software application. These and other examples of granting access to a protected resource 131 will be described in further detail below with regards to FIGS. 8-10.

As will be described in further detail below, UE1 may include a transceiver that periodically generates a beacon signal in accordance with a short-range radio access technology (RAT), such as Bluetooth, Bluetooth Low Energy (BLE), Zigbee, Wi-fi, etc., by way of air interface 106. The UE1 may also include a communications device for transmitting its current location (e.g., positioning data) over one or more of the air interfaces 104 and 108 according to one or more RATs. For example, UE1 may be configured to transmit its current location to location server 170 via a first RAT, such as long term evolution (LTE) by way of air interface 104. In another example, UE1 may be configured to transmit its current location to location server 170 via a second RAT, such as wi-fi, by way of air interface 108.

Referring to FIG. 1, location server 170 is shown as connected to the Internet 175, the core network 140, or both. The location server 170 can be implemented as a plurality of structurally separate servers, or alternately may correspond to a single server. As will be described below, location server 170 may include a UE location module for collecting positioning data from one or more UEs and for reporting the positioning data to one or more ACDs (e.g., ACD 127).

The features described herein are directed to apparatus and methods for ACD 127 to authenticate access to protected resource 131 utilizing a multi-factor authentication procedure, which may be summarized as follows: (1) ACD 127 detects a beacon signal (e.g., Bluetooth (BLE) beacon signal transmitted by a UE1 via air interface 106); (2) In response to detecting the presence of the beacon signal, the ACD 127 communicates with a location server 170 (e.g., via air interfaces 104 or 108) to obtain a current geo-location of the UE1, where UE1 is a trusted UE that has been previously associated with the ACD 127; (3) The location server 170 then queries UE1 based, in part, on a unique device identifier (e.g., IMSI number) to obtain a current geo-location of UE1 (e.g., via air interfaces 104 or 108); (4) Upon receiving the current geo-location of UE1, the location server 170 may: (a) forward the current geo-location information (e.g., location coordinates) to the ACD 127, such that the ACD 127 may determine if UE1 is within a threshold distance of the ACD 127; (b) determine the distance between UE1 and the ACD 127 and forward the distance information to the ACD 127; or (c) determine whether UE1 is within the threshold distance of the ACD 127 and send a notification to the ACD 127 indicating as such; (5) in response to receiving the indication of UE1's current location at the ACD 127, and if the information received from the location server 170 indicates that UE1 is within a threshold distance (e.g., within a "safe zone"), the ACD 127 may then begin monitoring the signal strength (e.g., RSSI) of the received beacon signal; and (6) Once the signal strength of the beacon signal indicates that UE1 is within close range to the ACD 127 (e.g., RSSI>signal strength threshold), then ACD 127 may generate an access signal 129, where access signal 129 indicates that the User1 associated with UE1 is authorized to access the protected resource 131.

Accordingly, aspects of the present disclosure provide a multi-factor authentication procedure that utilizes both geo-location information and signal strength measurements. Of particular note, is that aspects of the present disclosure eliminate the need for a dedicated application to be installed on the UE and eliminate the need for any user interaction. Furthermore, the examples provided herein may increase security as no communication session is established between the UE1 and the ACD 127, nor does the location server 170 provide any unlock command to the ACD 127 (i.e., the ACD 127 may make the determination to grant access to the protected resource 131 on its own accord). Even still, authentication is further enhanced by utilizing existing device identifiers (e.g., IMSI number included in a subscriber identity module (SIM) card of the UE1) to verify a trusted UE.

Figure 2:
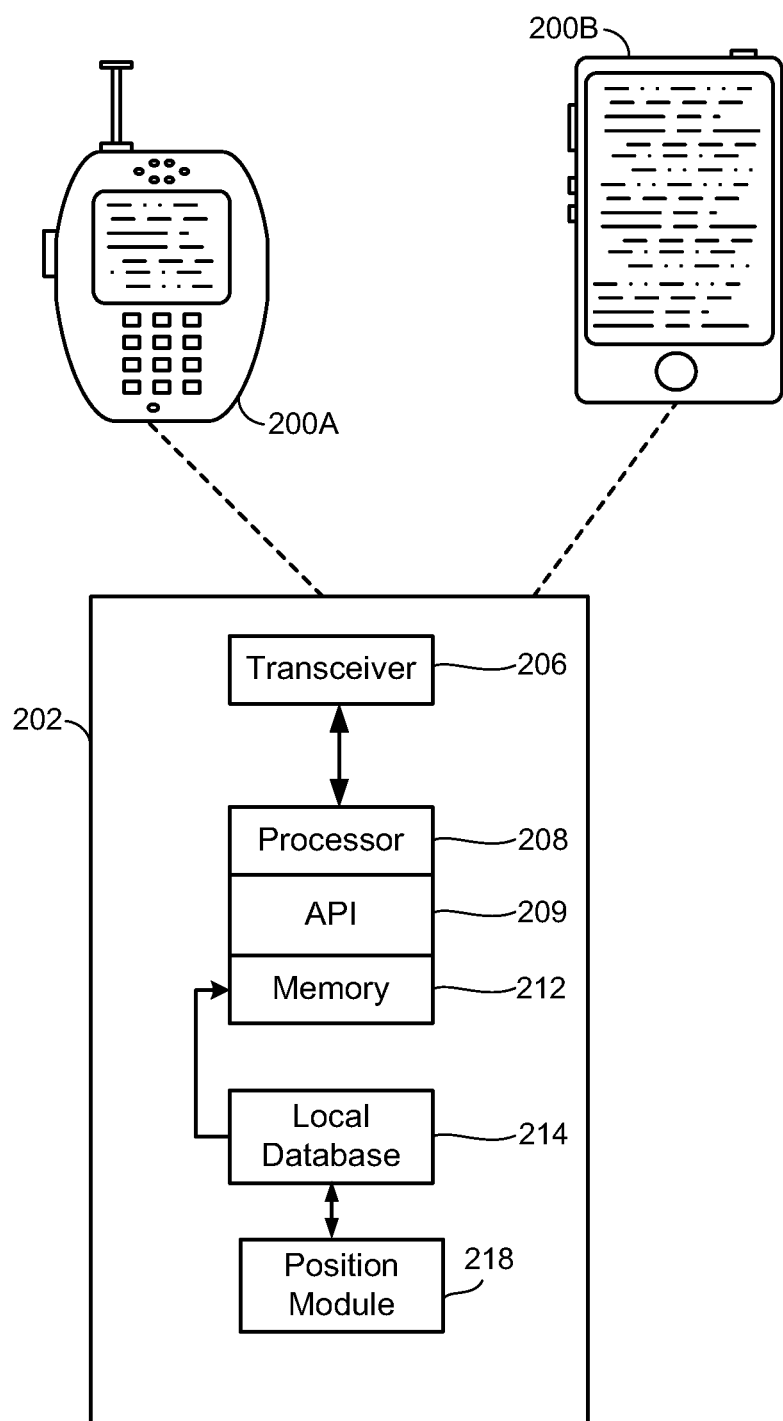
FIG. 2 illustrates examples of user equipments (UEs).

FIG. 2 illustrates examples of UEs (i.e., user devices) in accordance with embodiments of the present disclosure. UEs 200A and 200 B are possible implementations of the UE1 of FIG. 1. The various device types illustrated in FIG. 2 include a mobile phone (e.g., UE 200A) and smart phone (e.g., UE 200B).

UEs 200A and 200B, may also be referred to as cellular phones and includes portable telephones that can make and receive calls over a radio frequency link while the user is moving within a telephone service area.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application servers, web URLs, etc.). The platform 202 can also independently execute locally stored applications without RAN interaction. The platform 202 can include a transceiver 206 operably coupled to a processor 208 (e.g., an application specific integrated circuit (ASIC) or other microprocessor, logic circuit, data processing device, etc.). The processor 208 executes the application programming interface (API) 209 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Platform 202 may also include a position module 218 that provides one or more motion and/or position determination functionalities. Such motion and/or position determination capabilities may be provided using digital cellular positioning techniques and/or Satellite Positioning Systems (SPS). Additionally, the position module 218 may include one or more motion sensors (e.g., simple switches, accelerometers, angle sensors, etc.), or other on-board devices to provide relative position, velocity, acceleration, and/or orientation information of the UE, itself.

Accordingly, an embodiment of the invention can include a UE (e.g., UE 200A-B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, the position module 218 may also be configured to respond to queries received from a location server (e.g., location server 170) and in response thereto, report a current location of the platform 202 back to location server 170.

The processor 208 may execute instructions and perform tasks under the direction of software components that are stored in memory 212. For example, the memory 212 may store various software components that are executable or accessible by the one or more processors 208.

The position module 218 may include routines, program instructions, objects, and/or data structures that perform particular tasks or implement particular abstract data types. For example, the position module 218 may include one or more instructions, which when executed by the one or more processors 208 direct the UE to perform operations related to receiving, processing, reporting, and presenting positioning data indicating a current geo-location of the UE.

Thus, in some aspects, the processor 208, memory 212, API 209, local database 214, and position module 218 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. Voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Furthermore, the transceiver 206, may be configured to periodically broadcast a beacon signal in accordance with a short-range radio access technology (RAT), such as Bluetooth, Bluetooth Low Energy (BLE), Zigbee, Wi-fi, etc. In some examples, the beacon signal generated by the transceiver 206 may include a unique identifier. In some examples, the unique identifier is unique to the UE such as an Integrated Circuit Card Identifier (ICCID) of a subscriber identity module (SIM) card of the UE, an International Mobile Equipment Identity (IMEI) of the UE, or an International Mobile Subscriber Identity (IMSI) of the UE. In other examples, the identifier may be unique to the beacon signal generated by the transceiver 206 (e.g., iBeacon ID, universally unique identifier (UUID), globally unique identifier (GUID), etc.).

Figure 3:
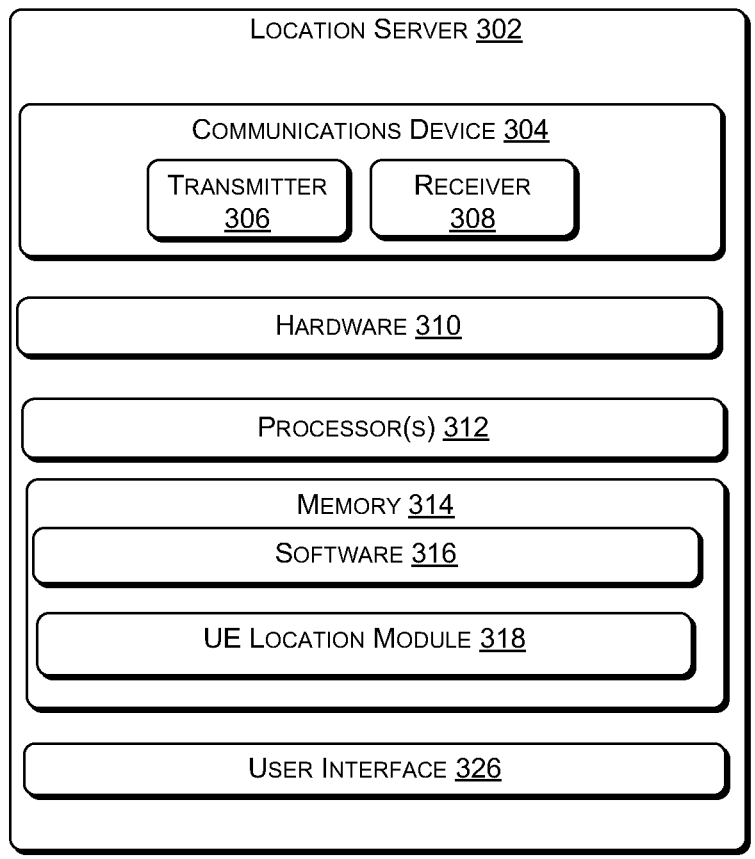
FIG. 3 illustrates an example location server.

FIG. 3 illustrates an example server 302. Server 302 is one possible implementation of location server 170 of FIG. 1. The components illustrated in FIG. 3 may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The location server 302 may include at least one communication device (represented by the communication device 304) for communicating with other nodes. For example, the communication device 304 may comprise a network interface that is configured to communicate with one or more network entities via a wire-based or wireless links. In some aspects, the communication device 304 may be implemented as a transceiver configured to support wire-based or wireless signal communication. This communication may involve, for example, sending and receiving: messages, parameters, or other types of information. Accordingly, in the example of FIG. 3, the communication device 304 is shown as comprising a transmitter 306 and a receiver 308.

The location server 302 may also include other components that may be used in conjunction with the operations as taught herein. For example, the location server 302 may include hardware 310, one or more processors 312, memory 314, and a user interface 326.

The hardware 310 may include additional hardware interfaces, data communications, and/or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

In addition, the location server 302 may include a user interface 326 for providing indications (e.g., audible and/or visual indications) to a user and/or for receiving user input (e.g., upon user actuation of a sensing device such a keypad, a touch screen, a microphone, and so on).

The memory 314 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processor 312 of location server 302 may execute instructions and perform tasks under the direction of software components that are stored in memory 314. For example, the memory 314 may store various software components that are executable or accessible by the one or more processors 312 of the location server 302. The various components may include software 316 and a UE location module 318.

The software 316 and UE location module 318 may include routines, program instructions, objects, and/or data structures that perform particular tasks or implement particular abstract data types. For example, the UE location module 318 may include one or more instructions, which when executed by the one or more processors 312 direct the location server 302 to perform operations related to: receiving and responding to queries for a UE location generated by ACD 127 and initiating and receiving UE location queries to and from UE1.

In operation, the UE location module 318 may receive a query from ACD 127 for the current location of a particular UE (e.g., UE1). In some aspects, a received query includes a unique identifier of the UE for which location information is requested (e.g., ICCID, IMEI, IMSI, iBeacon ID UUID, GUID, etc.). Based on the unique identifier, the UE location module 318 may send a query to the UE itself (e.g., via core network 140 and/or internet 175). In response to receiving the current location of the UE, the location server 302 may generate and send a response to the ACD 127 that provides an indication of the current location of the UE.

As mentioned above, the location server 302 may communicate the current location of the UE in a variety of ways. For example, in one embodiment, the UE location module 318 may forward the current geo-location information (e.g., location coordinates) to the ACD 127, such that the ACD 127 may determine if UE1 is within a threshold distance of the ACD 127. In another example, the UE location module may determine the distance between UE1 and the ACD 127 based on a known location of the ACD 127 (stored in memory 314) and forward the distance information to the ACD 127. In yet another example, the UE location module 318 may determine whether UE1 is within the threshold distance of the ACD 127 and send a notification to the ACD 127 indicating as such.

Figure 4:
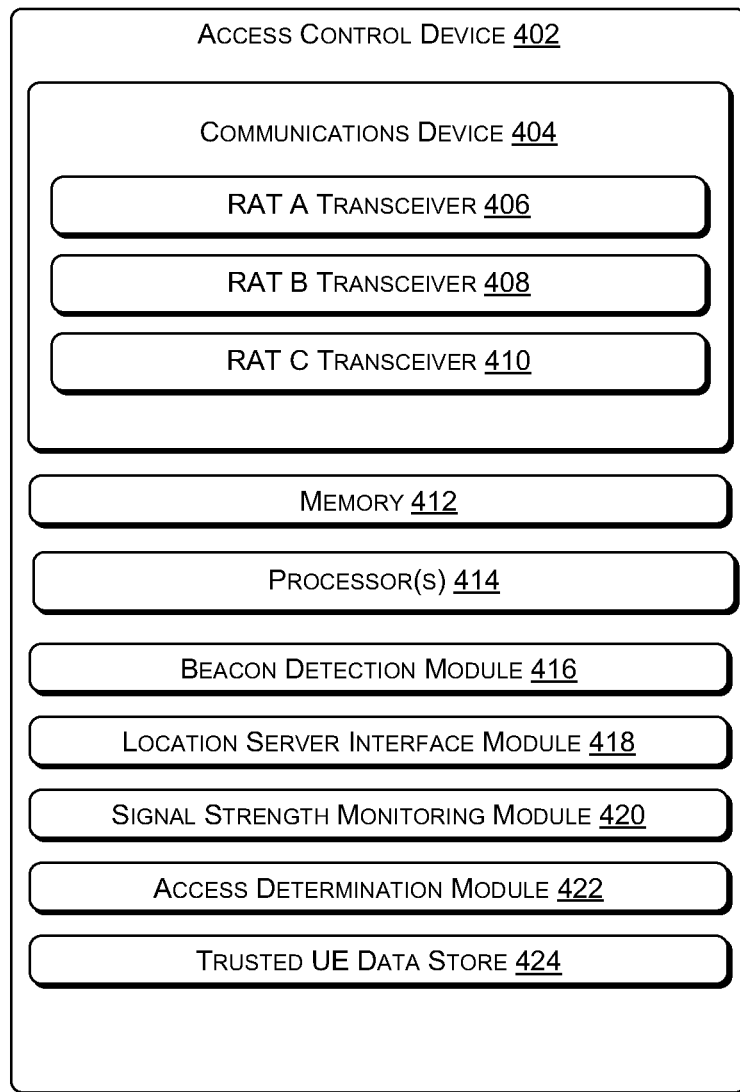
FIG. 4 illustrates an example access control device (ACD).

FIG. 4 illustrates an example access control device (ACD) 402. ACD 402 is one possible implementation of ACD 127 of FIG. 1. In the example of FIG. 4, the communication device 404 of the ACD 402 includes a RAT A transceiver 406 that is configured to operate in accordance with a short-range RAT (e.g., Bluetooth and/or BLE). The communication device 404 may also include a RAT B transceiver 408 that is configured to operate in accordance with another RAT (e.g., LTE). Further shown as included in the example communication device 404 is a RAT C transceiver 410 that may be configured to operate in accordance with yet another RAT (e.g., wi-fi). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing) Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The RAT transceivers 406-410 may provide different functionalities and may be used for different purposes. As an example, the RAT A transceiver 406 may operate in accordance with Bluetooth technology to detect beacon signals broadcast by UE1, while the RAT B transceiver 408 may operate in accordance with LTE technology to communicate with location server 170.

The components illustrated in FIG. 4 may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The ACD 402 may also include other components that may be used in conjunction with the operations as taught herein. For example, the ACD 402 may include, memory 412, one or more processors 414, a beacon detection module 416, a location server interface module 418, a signal strength monitoring module 420, and access determination module 422, and a trusted UE data store 424.

The beacon detection module 416 of ACD 402 may include hardware and optionally software to detect the presence of beacon signals broadcast by one or more UEs (e.g., UE1). For example, the beacon detection module 416 may interface with RAT A transceiver 406 for detecting the presence of a Bluetooth or BLE beacon signal. In addition, the beacon detection module 416 may be configured to extract and/or determine a unique identifier that is included in the detected beacon signal. As mentioned above, in some aspects, no communication session need be established between the ACD 402 and the UE1. Thus, beacon detection module 416 may be configured to detect the presence of beacon signals generated by UEs, but need not send a response, or otherwise establish a communication session with the UE via the short-range communication RAT.

The location server interface module 418 of ACD 402 may include hardware and optionally software to communicate with a location server (e.g., location server 170). For example, location server interface module 418 may be configured to send a query to the location server 170 for a current location of the UE1. As mentioned above, the location server interface module 418 may include a unique identifier associated with UE1 in the query, itself, such that the location server 170 may obtain the location of the UE1 based on the unique identifier. The location server interface module 418 may also be configured to receive the indication of the current location of the UE1 from the location server 170.

The signal strength monitoring module 420 of ACD 402 may include hardware and optionally software to monitor the signal strength of one or more beacon signals broadcast by one or more UEs (e.g., UE1). In operation, the signal strength monitoring module 420 may begin monitoring the signal strength (e.g., RSSI) of the beacon signals broadcast by the UE1 in response to determining that the UE is within a threshold distance of the ACD 402. As mentioned above, in one example the location server 170 may provide the current location coordinate of the UE1. Thus, in this example, the signal strength monitoring module 420 may calculate a distance between the UE1 and the ACD 402 based on the location coordinates of the UE1 and known location coordinates of the ACD 402 (e.g., stored in memory 412). In other examples, the location server 170 may calculate a distance between the UE1 and the ACD 402 and communicate the distance information to the ACD 402. In either case, the ACD 402 may then compare the calculated distance with the threshold distance, and if the UE is within the threshold distance, the signal strength monitoring module 420 may initiate the monitoring of the signal strength threshold of the beacon signals. If the distance information indicates that the UE1 is not within the threshold distance, then the ACD 402 may disregard the beacon signal transmitted by the UE.

In some examples, if a beacon signal is detected, but it is determined that the UE1 is not within the threshold distance, then the ACD 402 may implement a delay period, where the location server interface module 418 may generate another query to obtain an updated location of the UE1 to determine whether the UE1 is now within the threshold distance.

In some aspects, the ACD 402 may detect the presence of several beacon signals, and generate a query for the current location of each of the UEs associated with the beacon signals. Thus, the received responses from the location server 170 may include both an indication of the current location of the UE and the associated unique identifier, such that the ACD 402 may correlate the detected beacon signal with the determined location.

The access determination module 422 of ACD 402 may include hardware and optionally software to generate an access signal (e.g., access signal 129 of FIG. 1). For example, in response to the signal strength monitoring module 420 detecting that the signal strength of the beacon signal generated by UE1 exceeds a signal strength threshold (e.g., indicating that the UE1 is in close proximity to the ACD 402), the access determination module 422 may generate the access signal 129 indicating that the user (e.g., User1) associated with the UE1 is authorized to access a protected resource (e.g., protected resource 131). In some examples, access determination module 422 is configured to send the access signal to a locking mechanism of a door lock to actuate the locking mechanism between a locked position and an unlocked position (e.g., transition to unlocked position in the case of granting authorization). In another example, the access determination module 422 is configured to send the access signal 129 to an automatic door opener to actuate a door between an open position and a closed position (e.g., transition to open position in the case of granting authorization). In yet another example, the access determination module 422 is configured to send the access signal 129 to a software application of a computing device to grant the user access to the software application and/or to protected data.

In some examples, the access determination module 422 may also implement one or more rule-based authentication techniques. For example, the access determination module 422 may be configured with one or more time-based rules to grant access to a protected resource only during specified times.

The trusted UE data store 424 of ACD 402 may include hardware and optionally software to maintain a list of trusted UEs and associated unique identifiers. For example, the trusted UE data store 424 may store a list of trusted UEs and their associated unique identifiers (e.g., ICCID, IMEI, IMSI, iBeacon ID UUID, GUID, etc.) for which the access determination module 422 may grant access to the protected resource. In one example, the list of trusted UEs are obtained by the ACD 402 during an initial setup of the device. In other examples, the ACD 402 may be configured to receive and updated list of trusted UEs via one or more of the RAT transceivers 406-410.

In some examples, when beacon detection module 416 detects the presence of a beacon signal transmitted by a UE, the beacon detection module 416 may determine whether the unique identifier included in the beacon signal corresponds to at least one of the trusted UEs included in the list of trusted UEs (e.g., stored in trusted UE data store 424). If so, ACD 402 may proceed with sending the query to the location server 170 to obtain a current location of the UE. However, if the unique identifier does not correspond to any of the trusted UEs included in the list of trusted UEs, the ACD 402 may deny access to the protected resource (e.g., do not query location server 170 for current location, do not monitor signal strength of beacon signal, and do not generate the access signal 129).

Figure 5:
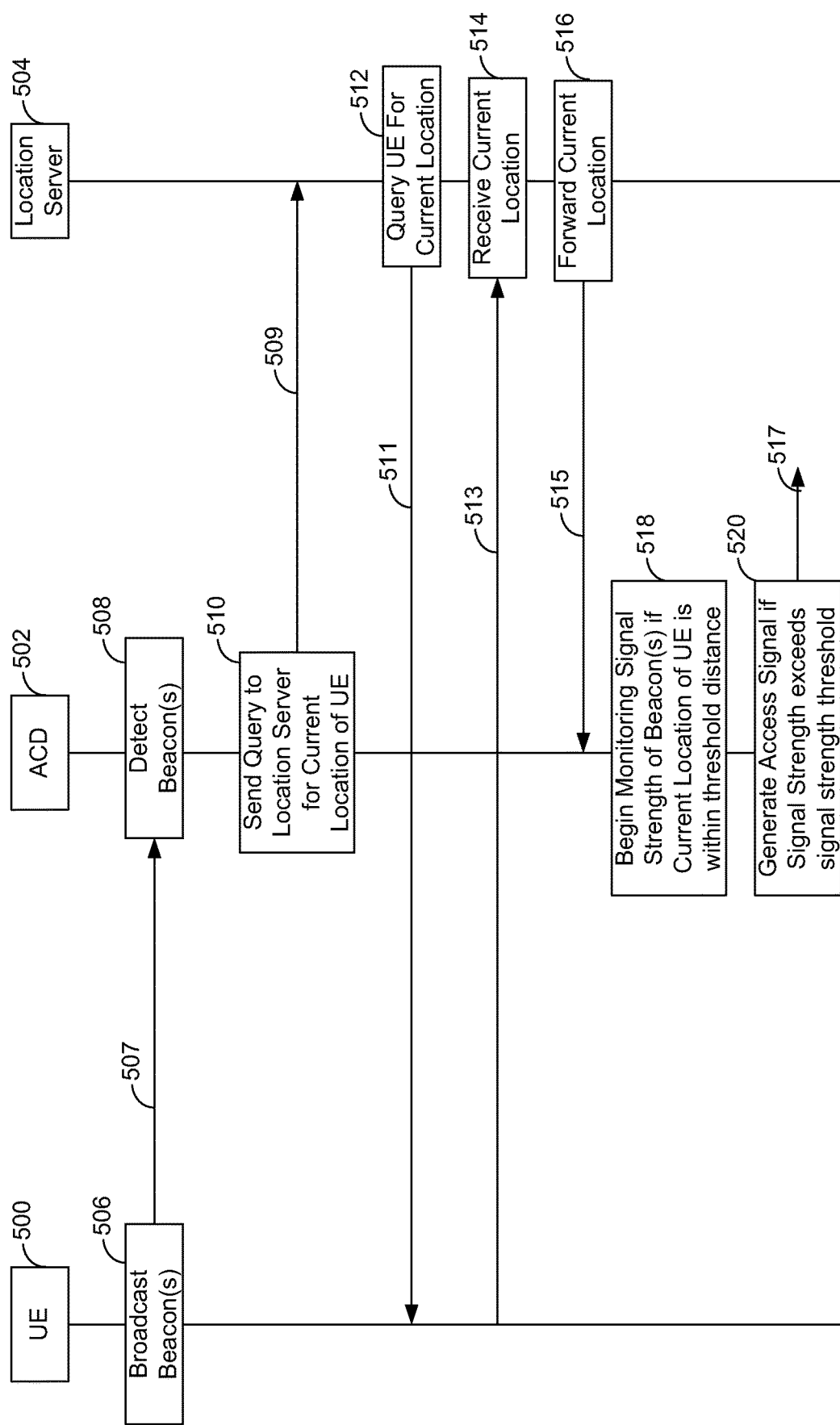
FIG. 5 is a call flow diagram of an example process for multi-factor authentication.

FIG. 5 is a call flow diagram of an example process for multi-factor authentication. FIG. 5 illustrates a UE 500, and ACD 502, and a location server 504. UE 500 may correspond to UE1 of FIG. 1, ACD 502 may correspond to ACD 127 of FIG. 1, and location server 504 may correspond to location server 170 of FIG. 1.

In block 506, the UE 500 generates one or more beacon signals 507. As mentioned above, aspects of the present disclosure may require little, if any, user interaction in order for ACD 502 to perform its authentication. For example, existing short-range communication technologies may provide for UE 500 to automatically generate the one or more beacon signals on a periodic basis, provided that the particular RAT has been enabled by the user (e.g., Bluetooth turned on by User1).

In block 508, the ACD 502 detects the beacon signal 507. As mentioned above, the ACD 502 need not respond to the UE 500 via the short-range RAT so as to further improve security. Thus, in response to detecting the beacon signal 507, the ACD 502 may first determine whether a unique identifier included in the beacon signal 507 corresponds to any of the UEs included in the list of trusted UEs (e.g., see trusted UE data store 424 of FIG. 4). If so, the ACD 502 may then generate and send a query 509 to the location server 504 for a current location of the UE 500.

Next, in block 512, the location server 504 generates and sends a query to UE 500 to obtain the current location of the UE 500. As mentioned above, the location server 504 may generate the query 511 based on the unique identifier included in the initial query 509. In some examples, the location server 504 is configured to not store the unique identifier in persistent storage, so as to prevent unauthorized access. That is, location server 504 may only temporarily store the unique identifier long enough for the location server 504 to send the query 511, receive the response 513 from the UE 500, and send the indication 515 to the ACD 502. After which, the unique identifier may be purged from the memory of location server 504.

Returning back to block 514, the location server 504 then receives a response 513 from the UE 500 which indicates the current location of the UE 500. In some examples, the response 513 may include the location coordinates (e.g., LAT/LONG) of the UE 500. Next, in block 516 the location server 504 forwards an indication 515 of the current location to the ACD 502.

In block 518, the ACD 502 receives the indication 515 and then determines whether the UE 500 is within a threshold distance of the ACD 502 based on the current location provided in indication 515. For example, as will be described below with reference to FIG. 6, a 'safe zone' may be established around the ACD 502, which may act as a geo-fence for determining which beacon signals to monitor for access to the protected resource. If the ACD 502 determines that the UE 500 is within the threshold distance, then the ACD 502 may then begin monitoring a signal strength of the beacon signals (e.g., beacon signal 507 as well as subsequent beacon signals periodically transmitted by UE 500). In block 520, the ACD 502 generates the access signal 517 to grant a user associated with UE 500 access to a protected resource.

Figure 6:
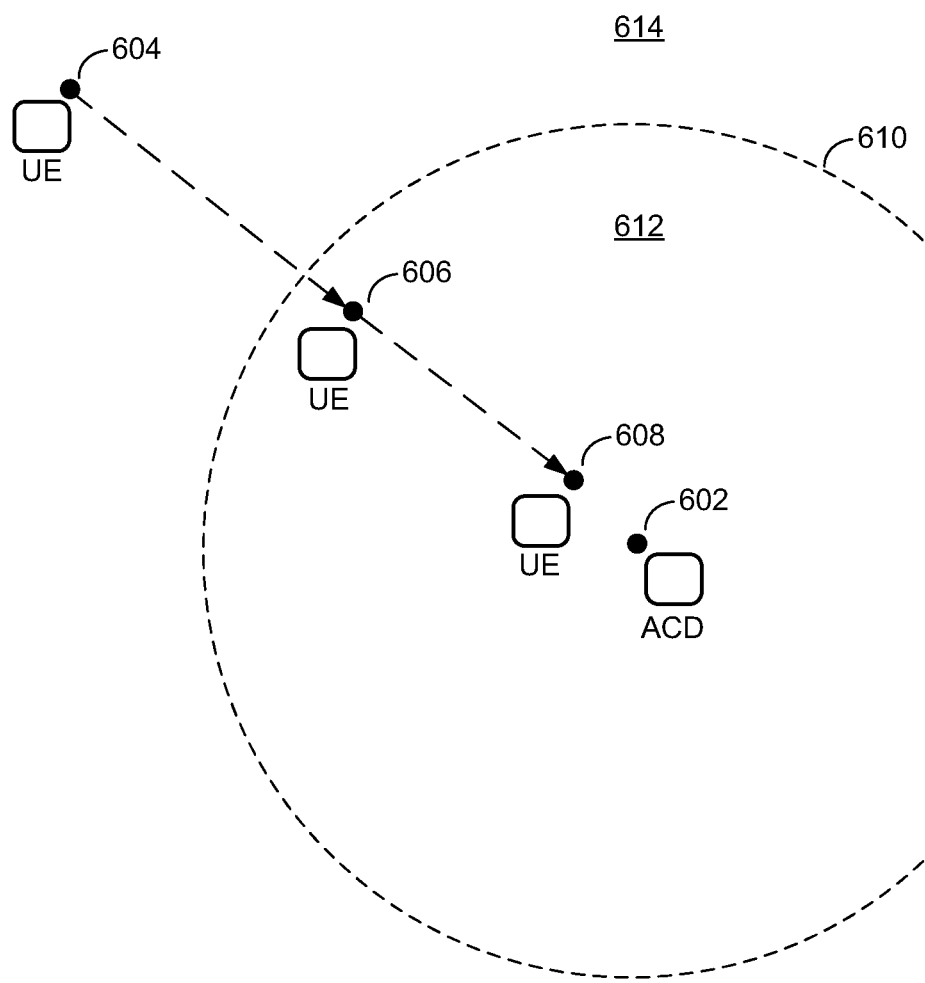
FIG. 6 is a diagram illustrating a UE at various locations with respect to an ACD.

FIG. 6 is a diagram illustrating a UE at various locations with respect to an ACD. As mentioned above, the ACD may be configured with a safe zone, which defines a threshold distance within which UEs have to be located in order for the ACD to begin monitoring the signal strength of the beacon signals. Thus, FIG. 6 illustrates an example threshold distance 610 from the ACD, which provides a 'safe zone' 612. Accordingly, the ACD may monitor the signal strength of beacon signal for UEs that are determined to be within the safe-zone 612 and may disregard beacon signals detected for UEs that are outside of the safe-zone 612 (shown in FIG. 6 as region 614).

By way of example, FIG. 6 illustrates a single UE at various locations 604-608. When the UE is at location 604, the ACD 602 may detect the presence of a beacon signal transmitted by the UE. In response to detecting the beacon signal, the ACD may query the location server for a current location of the UE. However, the indication of the current location provided by the location server indicates that the UE is not within the safe-zone 612 (e.g., not within the threshold distance). However, as the user moves towards the ACD, the UE may advance to position 606 that is within the safe-zone 612. Accordingly, the ACD may then begin monitoring the signal strength of the beacon signals transmitted by the UE. However, when the UE is located at position 606, the signal strength of the beacon signals may not exceed the signal strength threshold, indicating that the UE is not yet within close proximity to the ACD. However, the user may continue moving towards the ACD, such that at position 608, the signal strength of the beacon signals do indeed exceed the signal strength threshold. Accordingly, the ACD 602 may then generate the access signal (e.g., access signal 129 of FIG. 1) to grant the user access to the protected resource.

Figure 7:
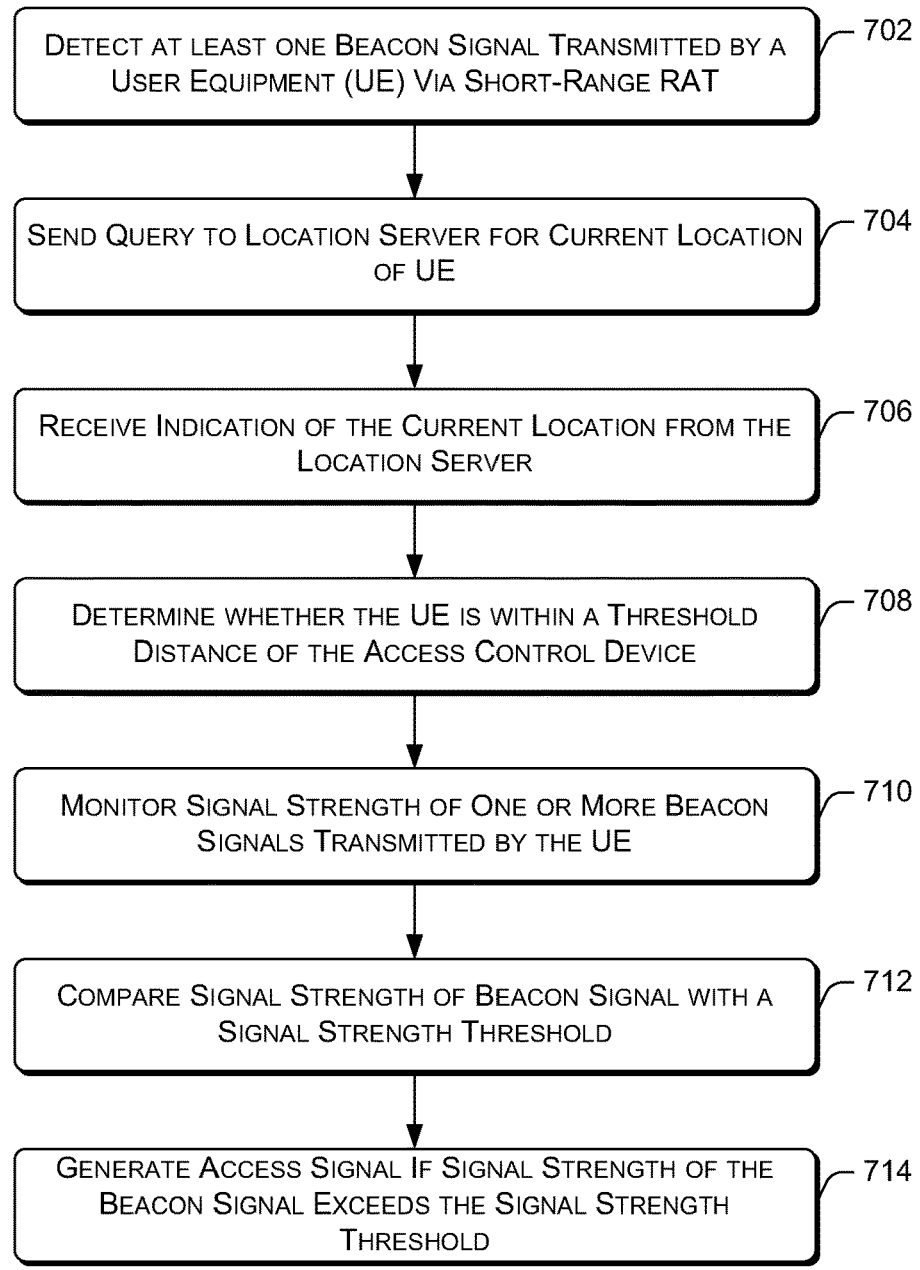
FIG. 7 is a flow diagram illustrating an example process for multi-factor authentication performed by an ACD.

FIG. 7 is a flow diagram illustrating an example process 700 for multi-factor authentication performed by an ACD. Process 700 is one example process performed by the ACD 402 of FIG. 4.

In a process block 702, the beacon detection module 416 of FIG. 4 detects at least one beacon signal transmitted by a UE (e.g., UE1 of FIG. 1) via a short-range RAT (e.g., Bluetooth, BLE, Zigbee, Wi-Fi, etc.). The ACD 402 may then determine whether a unique identifier included in the beacon signal correlates to any of the trusted UEs included in the trusted UE data store 424. If so, process 700 may proceed to process block 702, where the location server interface module 418 sends a query to the location server (e.g., location server 170) for a current location of the UE. Next, in process block 706, the location server interface module 418 receives an indication (e.g., position coordinates, distance, etc.) of the current location of the UE. In process block 708, the signal strength monitoring module 420 determines whether the UE is within a threshold distance (e.g., distance 610 of FIG. 6) of the ACD 402 based on the indication received from the location server.

If the ACD 402 determines that the UE is indeed within the threshold distance of the ACD 402, then process 700 proceeds to process block 710, where the signal strength monitoring module 420 initiates (i.e., begins) monitoring the signal strength of one or more beacon signals transmitted by the UE. In process block 712, the signal strength monitoring module 420 compares the signal strength of the beacon signal with a signal strength threshold (e.g., to determine whether the UE is in close proximity to the ACD 402). If so, then in process block 714, the access determination module 422 generates the access signal 129 to indicate that the user associated with the UE is granted access to a protected resource (e.g., protected resource 131 of FIG. 1).

Figure 8:
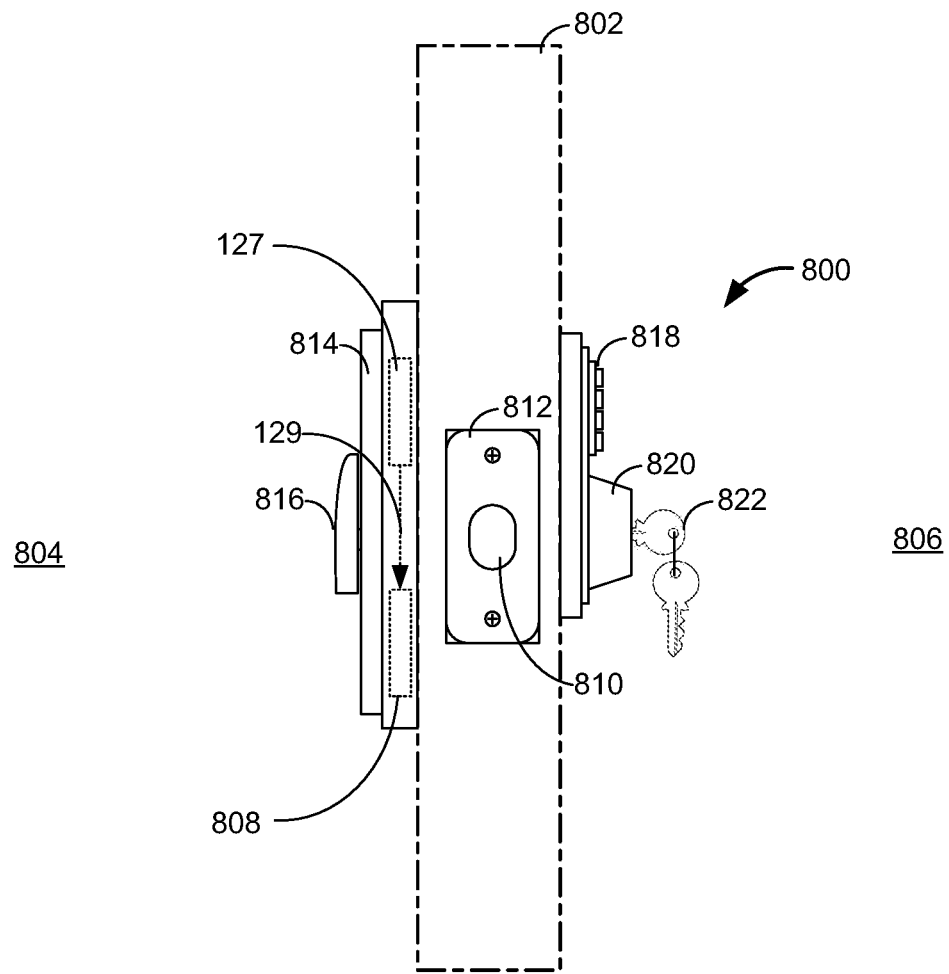
FIG. 8 is a diagram illustrating an example of an ACD controlling access by way of a door lock.

FIG. 8 is a diagram illustrating an example of ACD 127 controlling access by way of a door lock 800. As shown in FIG. 8, door lock 800 is mounted to a door 802 for controlling access to an area 804, which may be the interior of a dwelling, a storage area, an office, etc. Door lock 800 is shown as including a locking mechanism 808, a bolt 810, a strike plate 812, a housing 814, a thumb turn 816, a keypad 818, security ring 820, one or more keys 822, and ACD 127. In some embodiments, one or more of the thumb turn 816, keypad 818, security ring 820, and keys 822 are optional and may be omitted. Thumb turn 816 is configured to provide a user with manual control over a position of the bolt 810, between a locked position (e.g., extended) and an unlocked position (e.g., retracted) while the user is within the interior area 804. Similarly, security ring 820 and keys 822 are configured to provide a user with manual control over the position of the bolt 810 while the user is in the exterior area 806. Keypad 818 may be provided to allow a user to enter a code (e.g., alphanumeric characters) in order to trigger the locking mechanism 808 to actuate the bolt 810 between the locked and unlocked positions.

FIG. 8 also illustrates the door lock 800 as including an ACD 127. ACD 127 may be implemented as any of the example ACDs described herein, including ACD 402 of FIG. 4. ACD 127 may be incorporated within the housing 814 or ACD 127 may be fixedly attached to an exterior of the housing 814 (e.g., connected to thumb turn 816). As shown, once a user is authenticated (e.g., via process 700 of FIG. 7), the ACD 127 may generate and send the access signal 129 to the locking mechanism 808. In some examples, locking mechanism 808 includes a motor or other actuator to alter a position of the bolt 810 between the locked and unlock positions.

Figure 9:
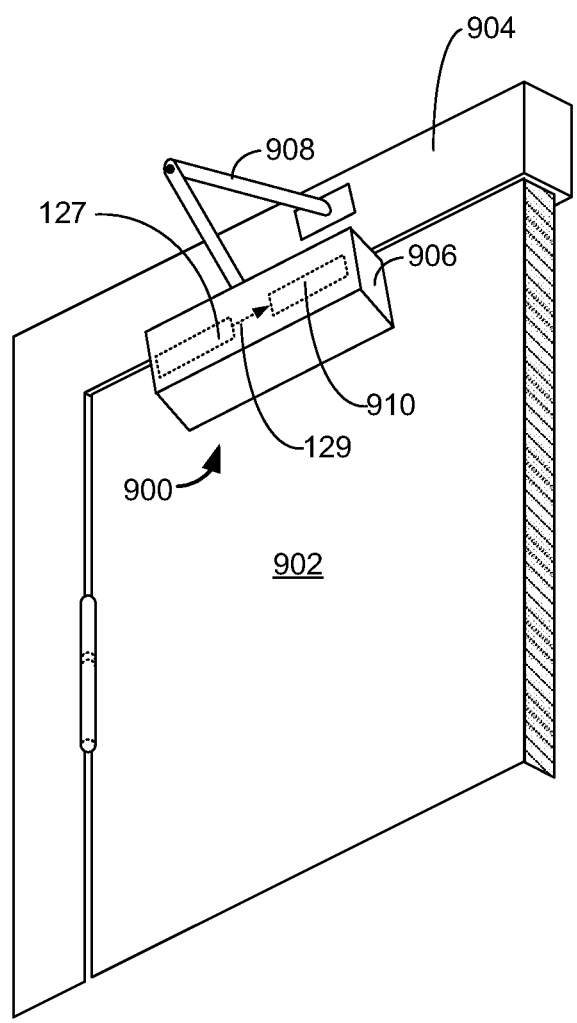
FIG. 9 is a diagram illustrating an example of an ACD controlling access by way of an automatic door opener.

FIG. 9 is a diagram illustrating an example of ACD 127 controlling access by way of an automatic door opener 900. As shown in FIG. 9, automatic door opener 900 is mounted between a door 902 and a door frame/wall 904 for controlling access to an area such as a dwelling, a storage area, an office, etc. Automatic door opener 900 is shown as including a housing 906, a level arm 908, a motor 910, and ACD 127.

ACD 127 of FIG. 9 may be implemented as any of the example ACDs described herein, including ACD 402 of FIG. 4. ACD 127 may be incorporated within the housing 906 or ACD 127 may be fixedly attached to an exterior of the housing 906. As shown, once a user is authenticated (e.g., via process 700 of FIG. 7), the ACD 127 may generate and send the access signal 129 to the motor 910. In some examples, the motor 910 or other actuator is configured to alter a position of the door 902 between an open position and a closed position by way of lever arm 908.

Figure 10:
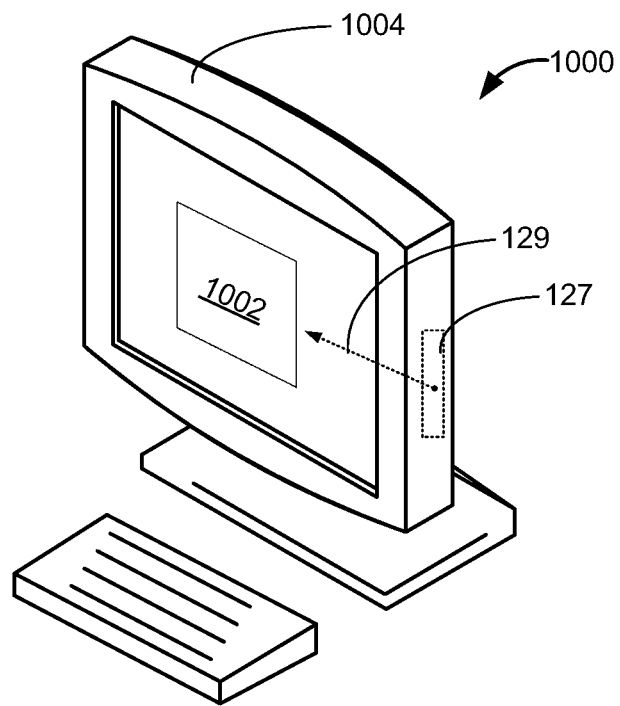
FIG. 10 is a diagram illustrating an example of an ACD controlling access to a software application of a computing device.

FIG. 10 is a diagram illustrating an example of ACD 127 controlling access to a software application 1002 of a computing device 1000. The computing device 1000 may be implemented as different types of apparatuses in different implementations (e.g., in an ASIC, in an SoC, etc.). Furthermore, the illustrated components of computing device 1000 may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The computing device 1000 may include at least one communication device for communicating with other nodes. For example, the computing device 1000 may comprise a network interface that is configured to communicate with one or more network entities via a wire-based or wireless links. The computing device 1000 may also include other components that may be used in conjunction with the operations as taught herein. For example, the computing device 1000 may include hardware, one or more processors, memory, and a user interface.

The hardware of computing device 1000 may include additional hardware interfaces, data communications, and/or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

In addition, the computing device 1000 may include a user interface for providing indications (e.g., audible and/or visual indications) to a user and/or for receiving user input (e.g., upon user actuation of a sensing device such as a keypad, a touch screen, a microphone, and so on).

The processor of computing device 1000 may execute instructions and perform tasks under the direction of software components that are stored in memory. For example, the memory of computing device may store various software components that are executable or accessible by the one or more processors of the location server computing device. The various components may include software application 1002.

The software application 1002 may include routines, program instructions, objects, and/or data structures that perform particular tasks or implement particular abstract data types. For example, the software application 1002 may provide a secure interface, where access to the software application 1002 is only provided after a user has first been authenticated.

Accordingly, computing device 1000 may include ACD 127. The ACD 127 of FIG. 10 may be implemented as any of the example ACDs described herein, including ACD 402 of FIG. 4. ACD 127 may be incorporated within the housing 1004 of the computing device 1000 or ACD 127 may be fixedly attached to an exterior of the housing 1004 (e.g., as a peripheral device). As shown, once a user is authenticated (e.g., via process 700 of FIG. 7), the ACD 127 may generate and send the access signal 129 to the software application 1002. In some examples, the software application 1002 is configured to grant user access to the software application 1002 in response to receiving the access signal 129.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of multi-factor authentication, performed by an access control device, the method comprising:
    detecting, by the access control device, at least one beacon signal of a plurality of beacon signals periodically transmitted by a user equipment (UE) via a short-range radio access technology (RAT), wherein the at least one beacon signal includes a unique identifier of the UE;
    sending a query to a location server for a current location of the UE in response to detecting the at least one beacon signal;
    receiving an indication of the current location from the location server in response to sending the query;
    determining whether the UE is within a threshold distance of the access control device based on the indication of the current location;
    monitoring a signal strength of one or more beacon signals of the plurality of beacon signals periodically transmitted by the UE in response to determining that the UE is within the threshold distance;
    comparing the signal strength of the one or more beacon signals with a signal strength threshold;
    generating an access signal in response to determining that the signal strength of the one or more beacon signals exceeds the signal strength threshold, wherein the access signal indicates that a user associated with the UE is authorized to access a protected resource;
    maintaining a list of trusted UEs and associated unique identifiers;
    determining whether the unique identifier of the UE corresponds to a trusted UE included in the list of trusted UEs, wherein sending the query to the location server for the current location of the UE is in response to determining that the unique identifier of the UE is included in the list of trusted UEs; and
    denying access to the protected resource in response to determining that the unique identifier of the UE does not correspond to any trusted UEs included in the list of trusted UEs.

2. The method of claim 1, wherein the short-range RAT comprises Bluetooth, Bluetooth Low Energy (BLE), Wi-Fi, or Zigbee.

3. The method of claim 1, wherein the unique identifier comprises an Integrated Circuit Card Identifier (ICCID) of a subscriber identity module (SIM) card of the UE, an International Mobile Equipment Identity (IMEI) of the UE, or an International Mobile Subscriber Identity (IMSI) of the UE.

4. The method of claim 1, wherein querying the location server for the current location of the UE comprises forwarding the unique identifier to the location server, wherein the location server obtains the current location of the UE based on the unique identifier.

5. The method of claim 1, wherein receiving the indication of the current location from the location server comprises receiving current location coordinates of the UE, the method further comprising:
 calculating a distance between the UE and the access control device based on the current location coordinates of the UE and location coordinates of the access control device, wherein monitoring the signal strength of the one or more beacon signals periodically transmitted by the UE is in response to determining that calculated distance is less than the threshold distance.

6. The method of claim 1, wherein receiving the indication of the current location from the location server comprises receiving a distance between the UE and the access control device, determined by the location server, the method further comprising:
 monitoring the signal strength of the one or more beacon signals in response to determining that the distance is less than the threshold distance.

7. The method of claim 1, wherein receiving the indication of the current location from the location server comprises receiving a notification that the UE is within the threshold distance of the access control device, the method further comprising:
 monitoring the signal strength of the one or more beacon signals in response to receiving the notification.

8. The method of claim 1, wherein monitoring the signal strength of one or more beacon signals comprises determining a received signal strength indication (RSSI) of the one or more beacon signals.

9. The method of claim 1, wherein generating the access signal comprises sending the access signal to a locking mechanism to actuate the locking mechanism between a locked position and an unlocked position.

10. The method of claim 1, wherein generating the access signal comprises sending the access signal to an automatic door opener to actuate a door between an open position and a closed position.

11. The method of claim 1, wherein generating the access signal comprises sending the access signal to a software application of a computing device to grant the user associated with the UE access to the software application.

12. An access control device, comprising:
 at least one processor; and
 at least one memory coupled to the at least one processor, the at least one memory having instructions stored therein, which when executed by the at least one processor, direct the access control device to:
 detect at least one beacon signal of a plurality of beacon signals periodically transmitted by a user equipment (UE) via a short-range radio access technology (RAT), wherein the at least one beacon signal includes a unique identifier of the UE;
 send a query to a location server for a current location of the UE in response to detecting the at least one beacon signal;
 receive an indication of the current location from the location server in response to sending the query;
 determine whether the UE is within a threshold distance of the access control device based on the indication of the current location;
 monitor a signal strength of one or more of the plurality of beacon signals periodically transmitted by the UE in response to determining that the UE is within the threshold distance;
 compare the signal strength of the one or more beacon signals with a signal strength threshold;
 generate an access signal in response to determining that the signal strength of the one or more beacon signals exceeds the signal strength threshold, wherein the access signal indicates that a user associated with the UE is authorized to access a protected resource;
 maintain a list of trusted UEs and associated unique identifiers;
 determine whether the unique identifier of the UE corresponds to a trusted UE included in the list of trusted UEs, wherein the instructions to send the query to the location server for the current location of the UE comprises instructions to send the query in response to determining that the unique identifier of the UE is included in the list of trusted UEs; and
 deny access to the protected resource in response to determining that the unique identifier of the UE does not correspond to any trusted UE included in the list of trusted UEs.

13. The access control device of claim 12, wherein the short-range RAT comprises Bluetooth, Bluetooth Low Energy (BLE), Wi-Fi, or Zigbee.

14. The access control device of claim 12, wherein the unique identifier comprises an Integrated Circuit Card Identifier (ICCID) of a subscriber identity module (SIM) card of the UE, an International Mobile Equipment Identity (IMEI) of the UE, or an International Mobile Subscriber Identity (IMSI) of the UE.

15. One or more non-transitory computer-readable media storing computer-executable instructions, which when executed by at least one processor of an access control device, direct the access control device to:
 detect at least one beacon signal of a plurality of beacon signals periodically transmitted by a user equipment (UE) via a short-range radio access technology (RAT), wherein the at least one beacon signal includes a unique identifier of the UE;
 send a query to a location server for a current location of the UE in response to detecting the at least one beacon signal;
 receive an indication of the current location from the location server in response to sending the query;
 determine whether the UE is within a threshold distance of the access control device based on the indication of the current location;
 monitor a signal strength of one or more of the plurality of beacon signals periodically transmitted by the UE in response to determining that the UE is within the threshold distance;
 compare the signal strength of the one or more beacon signals with a signal strength threshold;
 generate an access signal in response to determining that the signal strength of the one or more beacon signals exceeds the signal strength threshold, wherein the access signal indicates that a user associated with the UE is authorized to access a protected resource;

maintain a list of trusted UEs and associated unique identifiers;

determine whether the unique identifier of the UE corresponds to a trusted UE included in the list of trusted UEs, wherein the instructions to send the query to the location server for the current location of the UE comprises instructions to send the query in response to determining that the unique identifier of the UE is included in the list of trusted UEs; and deny access to the protected resource in response to determining that the unique identifier of the UE does not correspond to any of the trusted UEs included in the list of trusted UEs.

16. The one or more non-transitory computer-readable media of claim 15, wherein the short-range RAT comprises Bluetooth, Bluetooth Low Energy (BLE), Wi-Fi, or Zigbee.

17. The one or more non-transitory computer-readable media of claim 15, wherein the unique identifier comprises an Integrated Circuit Card Identifier (ICCID) of a subscriber identity module (SIM) card of the UE, an International Mobile Equipment Identity (IMEI) of the UE, or an International Mobile Subscriber Identity (IMSI) of the UE.

18. The one or more non-transitory computer-readable media of claim 15, wherein querying the location server for the current location of the UE comprises forwarding the unique identifier to the location server, wherein the location server obtains the current location of the UE based on the unique identifier.

19. The one or more non-transitory computer-readable media of claim 15, wherein receiving the indication of the current location from the location server comprises receiving current location coordinates of the UE, the access control device further configured to:

calculate a distance between the UE and the access control device based on the current location coordinates of the UE and location coordinates of the access control device, wherein monitoring the signal strength of the one or more beacon signals periodically transmitted by the UE is in response to determining that calculated distance is less than the threshold distance.

20. The one or more non-transitory computer-readable media of claim 15, wherein receiving the indication of the current location from the location server comprises receiving a distance between the UE and the access control device, determined by the location server, the access control device further configured to:

monitor the signal strength of the one or more beacon signals in response to determining that the distance is less than the threshold distance.

* * * * *